Feb. 15, 1938. W. STÖBER 2,108,620
CONTROL OF ALTERNATING CURRENT COMMUTATOR MOTORS
Filed Sept. 1, 1936

Inventor:
Wolfgang Stöber
by Harry E. Dunham
His Attorney.

Patented Feb. 15, 1938

2,108,620

UNITED STATES PATENT OFFICE 2,108,620

CONTROL OF ALTERNATING-CURRENT COMMUTATOR MOTORS

Wolfgang Stöber, Berlin-Pankow, Germany, assignor to General Electric Company, a corporation of New York Application September 1, 1936, Serial No. 98,869
In Germany November 4, 1935

2 Claims. (Cl. 172—274)

My invention relates to the control of alternating-current commutator motors and its primary object is to obtain a wide range of speed control economically.

A further object of my invention is to obtain power-factor compensation.

The invention is applicable to alternating-current shunt commutator motors of the type in which the commutated secondary winding is connected effectively in shunt to the primary winding through double-voltage induction regulator apparatus, which affords a means of adjusting the relative values of voltage applied to the primary and secondary for speed control.

If, in the usual arrangement, the range of speed control above and below synchronism is not the same, the double induction regulator must, nevertheless, be designed for the maximum speed regulation away from synchronism. This requires an expensive double induction regulator, which is not fully utilized in the minimum speed range away from synchronism. According to the present invention, the double induction regulating transformer is designed for equal speed ranges above and below synchronism and the extra voltage which is necessary to apply to the commutator brushes for speeds beyond the range of the double induction regulator is obtained by additional transformer means. For example, the extra voltage may be obtained from an auxiliary winding in the primary of the motor or from an auxiliary transformer with less expense than would be the case where the double induction regulator is designed to furnish the extra regulating voltage. I also prefer to obtain the extra regulating voltage in such a way as to introduce a power-factor-correcting compensating voltage into the motor.

Figure 1:
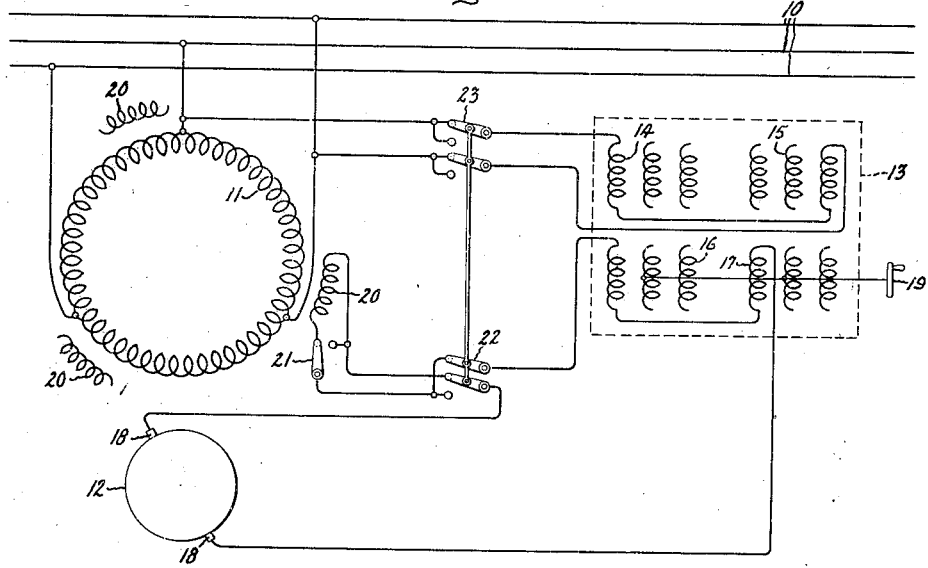
Figure 2:
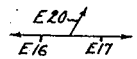
Figures 3, 4:
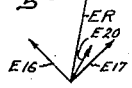
Figure 5:
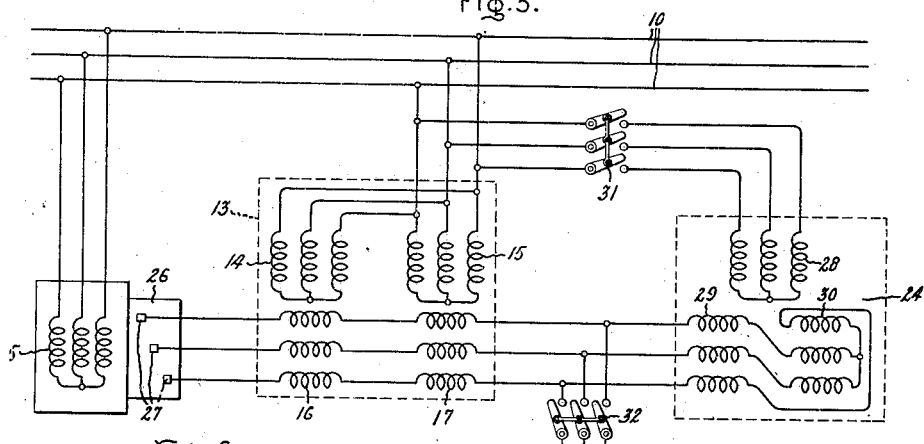
Figure 6:
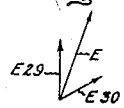

The features of my invention which are believed to be novel and patentable will be pointed out in the claims appended hereto. For a better understanding of my invention, reference is made in the following description to the accompanying drawing in which Fig. 1 represents an embodiment of my invention where the extra regulating voltage is obtained from an auxiliary compensating winding in the primary of the motor. In this figure, to simplify the diagram, one phase only of the regulating circuit is shown connected. Figs. 2, 3, and 4 are voltage vector diagrams explanatory of the regulation obtained with the Fig. 1 arrangement; Fig. 5 represents an embodiment of my invention where the extra regulating voltage is obtained from an auxiliary compensating transformer; and Fig. 6 is a voltage vector diagram pertaining to such transformer.

In Fig. 1, 10 represents a three-phase supply line for the shunt commutator motor having a main primary winding 11 and a commutated secondary winding, the commutator of which is indicated by the circle 12. 13 represents the usual double-voltage regulator, which is connected between the primary and secondary for speed control by varying the relative values of the primary and secondary voltages. Only one phase of the connections between primary and secondary is shown. As is known, the primary windings 14 and 15 of the double induction regulator may be connected in series or in parallel, the series connection being represented here. The secondary windings 16 and 17 of these regulators are connected in series with the commutator of the motor through brushes, one pair of which are represented at 18. The secondaries 16 and 17 are mounted on a shaft so as to be rotated with respect to the primaries 14 and 15 by a handwheel 19. Where, as here, the secondaries are rotated in the same direction simultaneously, the phase rotations of the two regulators should be reversed. The primary windings are thus connected for reversed phase rotations. As is well known, the secondaries of such double induction regulator may be rotated to such a position that their voltages buck each other, in which case, no regulating voltage is injected into the secondary circuit of the motor. In another rotative position of the induction regulator secondaries, their voltages are in phase and a maximum regulating voltage is obtained. In intermediate rotative positions then, voltages add vectorially to obtain other intermediate regulating voltages. Likewise, the phase of the resultant voltage may be reversed for operation above and below synchronism.

Let it be assumed now that the motor of Fig. 1 is a 60 cycle, six-pole motor which, therefore, has a synchronous speed of 1200 revolutions per minute. If the speed range desired is say from 900 to 1450 revolutions per minute, the double-voltage induction regulator will be substantially fully utilized at both the high and low speeds. If, however, a speed range of from 1000 to 1600 revolutions per minute is desired, it will be necessary to considerably increase the voltage-regulating range of the regulator for the high speed, which will add materially to the size and cost of such regulator, unless we resort to the present invention. Also, the higher cost regulator will not be efficiently utilized for the low-speed range as it will be much larger than is necessary for the low speed.

According to my invention, I provide an induction regulator of only the size necessary to take care of the minimum range of speed regulation away from synchronism. In the example last given, this would take care of the speed range from 1000 to say about 1350 revolutions per minute. Then, in order to operate up to 1600 revolutions per minute, I inject an additional voltage in the regulating circuit which, when added to the regulating voltage obtainable from the double induction regulator, permits of the additional range of speed desired.

In Fig. 1, this additional voltage is obtained from an auxiliary winding 20 in the primary of the motor. The winding 11 acts as the primary and the winding 20 as the secondary of a transformer. 21 represents a switch by means of which the winding 20 may be cut in or out of the regulating circuit. 22 represents a reversing switch, which permits the voltage of winding 20 to be reversed in the regulating circuit when winding 20 is being utilized, if that should become desirable. Switch 22 may be interlocked with a switch 23, if desired, so that voltage may be removed from the double induction regulator at the time switch 22 is operated.

In Fig. 2, E16 and E17 represent the voltages of the induction regulator windings 16 and 17 at a time when they are in phase opposition or bucking. If winding 20 is connected in the regulating circuit at this time, its voltage may be represented by the vector E20. The resultant regulating voltage under this condition will be E20 since E16 and E17 cancel. The position of winding 20 and, consequently, the phase position of its vector E20 is preferably made such as to provide power-factor correction to the motor.

In Fig. 3, the vectors E16 and E17 have been shifted by adjustment of handwheel 19 to the positions indicated such that they combine with E20 to produce the resultant regulating voltage ER. It is evident that ER is greater than it would be if E20 were not present and also its phase angle is changed accordingly to provide power-factor correction. The vector diagram of Fig. 3 may represent a condition in the regulating range above synchronism.

Fig. 4 represents a vector relation of the induction regulator voltages in the speed range below synchronism with winding 20 cut out. It will be obvious that the voltage of winding 20, E20, Fig. 2, may be reversed by switch 22 and added in Fig. 4, if desirable. It will be evident that a quick change in speed may be obtained by operating switch 21 to cut winding 20 in and out, also that a greater quick change in speed may be obtained by reversing switch 22 with winding 20 in the regulating circuit. Such regulation may be advantageous in special circumstances where it is desirable to then return to an exact speed setting determined by the adjustment of the double-voltage regulator.

In case the extra voltage, E20, is to be used to shift the speed-regulating range in one direction only with respect to synchronous speed, the reversing switch 22 may be omitted.

In the arrangement of Fig. 1, all of the ampere turns of auxiliary stator winding 20 in addition to those of the rotor of the motor have to be balanced by ampere turns in the main stator winding 11. This scheme would, therefore, increase the size of the motor if the auxiliary winding is used for obtaining speeds considerably above synchronism and would, therefore, in such case, largely offset the advantages previously mentioned. In such cases, it is preferable to obtain the extra regulating voltage by an auxiliary transformer 24 in the manner exemplified in Fig. 5.

In Fig. 5, star connections are used in the motor and transformers, which result in a simplification of the connections and brush rigging of the motor. The primary winding of the motor is indicated at 25, the commutator at 26, and the brushes at 27. The double induction regulator 13 is the same as in Fig. 1 except that the primary windings 14 and 15 are connected in parallel instead of in series.

The auxiliary transformer 24 has primary winding 28 connected to source 10 and series connected secondary windings 29 and 30 displaced at a sixty-degree phase angle to each other. The secondary of the auxiliary transformer is connected in series in the secondary regulating circuit with windings 16 and 17 of the double-voltage regulator. Where it is desirable to cut out the auxiliary transformer, switches 31 and 32 may be provided. With switch 31 open and switch 32 closed, we would have a usual connection. With the auxiliary transformer in use, its secondary voltage is introduced into the regulating circuit to obtain the advantages previously described. In Fig. 6, E29 and E30 may represent the voltage vectors of windings 29 and 30. The resultant voltage E corresponds to the voltage E20 of Figs. 2 and 3. It may be given such value and phase angle as will produce the results desired in shifting the speed-regulating range and correcting the power factor of the motor. Such auxiliary transformer provides relatively inexpensive means for obtaining the results desired. In effect, it is the same auxiliary transformer as is constituted by windings 11 and 20 of Fig. 1 except that primary winding 11 in the motors has to supply both the motor and auxiliary transformer excitation and, where considerable regulating energy is to be transferred through such transformer, it is better to separate it from the motor as in Fig. 5.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. In a speed-regulating system, an alternating-current motor having a primary winding and a relatively rotatable commutated secondary winding, a double induction regulator for impressing an adjustable speed-regulating voltage on the commutated secondary winding of said motor, an auxiliary transformer means connected between the primary and secondary winding circuits of said motor for impressing an additional speed-regulating voltage on the commutated secondary winding of said motor, said additional voltage having such phase angle as to improve the power factor of said motor, and switching means for reversing the additional speed-regulating voltage with respect to the adjustable speed-regulating voltage and for disconnecting the auxiliary transformer means from the secondary winding circuit of the motor.

2. In a speed-regulating system, an alternating-current motor having a primary stator winding and a commutated secondary rotor winding, a double induction regulator having primary and secondary windings, additional transformer means having a secondary winding connected in series circuit relation with the secondary windings of said double induction regulator and the secondary winding of said motor, a common source of supply for the primary of said motor, the primary windings of said double induction regulator, and for said transformer, and means for reversing the voltage supplied by the secondary of said transformer in the series circuit in which it is connected.

WOLFGANG STÖBER.